United States Patent [19]

Atkinson

[11] 4,275,669

[45] Jun. 30, 1981

[54] CANE DIPPER-PLANTER WITH LIQUID TREATING

[76] Inventor: Kenneth R. Atkinson, Mail Service 368, Gin Gin, Queensland, Australia, 4671

[21] Appl. No.: 34,078

[22] Filed: Apr. 27, 1979

[51] Int. Cl.³ .............................. A01C 5/06; A01C 1/06
[52] U.S. Cl. ......................................... 111/3; 111/34; 111/74; 221/135; 222/190; 47/DIG. 9
[58] Field of Search ........................ 111/74, 2, 34, 3; 47/DIG. 9, 57.6; 221/135, 186; 222/167, 190, 169, 170, 172; 118/418

[56] References Cited

U.S. PATENT DOCUMENTS

| 1,527,128 | 2/1925 | Purouaux et al. ............... 222/167 |
| 1,664,773 | 4/1928 | Edelhoff ......................... 222/167 X |
| 3,943,862 | 3/1976 | Populin et al. ....................... 111/3 |

FOREIGN PATENT DOCUMENTS

| 214115 | 8/1957 | Australia ............................. 111/3 |
| 232822 | 2/1960 | Australia ............................. 111/3 |
| 487810 | 3/1975 | Australia . | |
| 488674 | 4/1976 | Australia . | |
| 666207 | 7/1963 | Canada ............................. 118/418 |
| 367388 | 3/1963 | Switzerland ..................... 272/170 |
| 265790 | 2/1927 | United Kingdom ............. 222/170 |
| 270367 | 9/1968 | U.S.S.R. ........................... 47/DIG. 9 |

*Primary Examiner*—Steven A. Bratlie
*Attorney, Agent, or Firm*—Schwartz, Jeffery, Schwaab, Mack, Blumenthal & Koch

[57] ABSTRACT

A cane dipper-planter where the pre-cut cane setts are conveyed from a supply hopper to a rotary drum which contains the treatment liquid and a series of lifting members around its internal wall which lift the treated setts out of the liquid and discharges them via an outlet chute to the furrow for planting.

5 Claims, 2 Drawing Figures

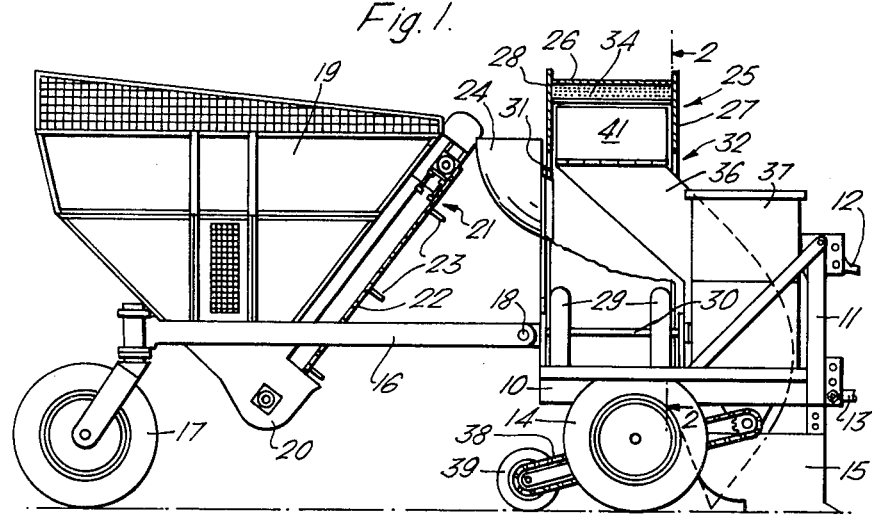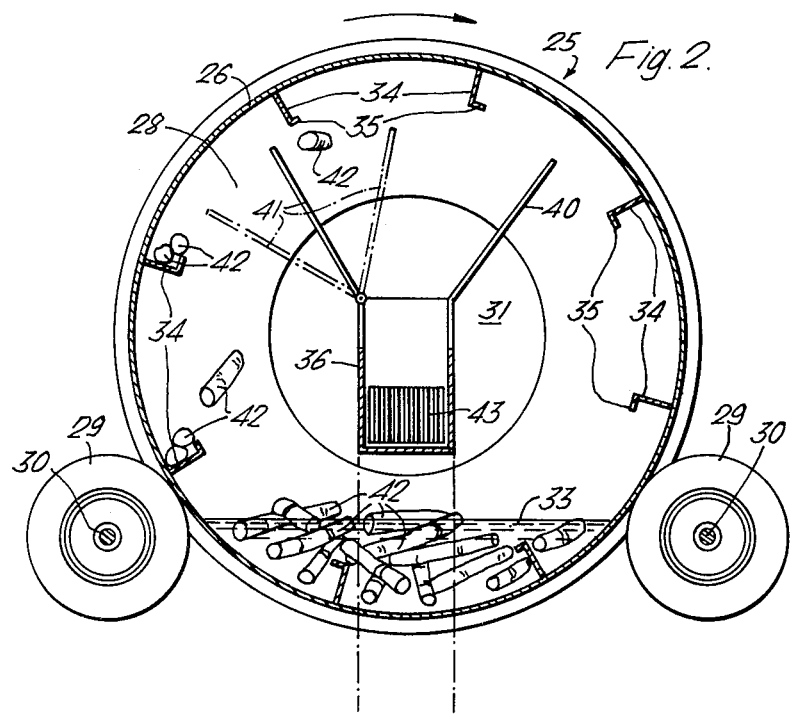

CANE DIPPER-PLANTER WITH LIQUID TREATING

BACKGROUND OF THE INVENTION (1) Field of the Invention

This invention relates to an improved sugar cane dipper-planter.

(2) Description of the Prior Art

Cane dipper-planters have been known for several years and have suffered from the problem of ensuring an even, continuous discharge of the cane setts to the furrow at a controlled rate. Examples of such dipper-planters are disclosed in Australian Pat. Nos. 487810 and 488674 (Populin et al). In these planters, a conveyor is required to convey the setts, one at a time, from a supply hopper to the dipping tank, where the conveyor has an upper run arranged to release excess setts and deflecting plates return them to the storage hopper. This arrangement is complicated, expensive to produce and does not ensure an accurate flow of setts to the furrow.

BRIEF SUMMARY OF THE INVENTION

The general object of the invention is to provide a cane dipper-planter for receiving cane setts to be planted, immersing them in a treating solution and discharging them at a controlled rate to be planted in a furrow, the apparatus being particularly simple and economical, compact, and efficient and durable to use.

Accordingly, the invention resides broadly in a cane dipper-planter of the type having a tractor-drawn main frame, a drill plough on the main frame for opening a furrow, a container for treating liquid, feed means for feeding cane setts to the treatment liquid and delivery means for delivering the setts from the liquid to the furrow wherein:

a drum is mounted on the main frame for rotation about a substantially horizontal axis;

the lower part of the drum forms the container for the treating liquid;

means are provided for rotating the drum;

the feed means include an inlet opening in an end of the drum;

and the delivery means include a delivery chute leading from within the drum through an outlet opening in the other end of the drum and a series of lifting members secured within the peripheral part of the drum for lifting setts, when the drum is rotated, from the lower part of the drum and discharging them gravitationally from the upper part of the drum to the delivery chute.

Other features of the invention will become apparent from the following description.

BRIEF DESCRIPTION OF THE SEVERAL VIEWS OF THE DRAWINGS

In order that a preferred embodiment of the invention may be readily understood and carried into practical effect, reference is now made to the accompanying drawings, wherein:

FIG. 1 is a partly broken-away side elevational view of a cane dipper-planter according to the invention, and FIG. 2 is a sectional view, to larger scale, along line 2—2 in FIG. 1.

DETAILED DESCRIPTION OF THE PREFERRED EMBODIMENT

The dipper-planter illustrated includes a main frame 10 having, at its front, an upright mounting frame 11 with means for the pivotal connection thereto of the three point linkage of a tractor (not shown) part of the central arm and of one side lifting arm of this linkage being indicated at 12 and 13 respectively. The main frame 10 is mounted on a pair of pneumatically tired wheels 14. Beneath the main frame 10 a drill plough 15 of conventional type is mounted in vertically adjustable manner, for opening a furrow as the planter is drawn by the tractor while in lowered or operative position, riding on its wheels 14.

A trailer frame 16, supported at the rear by a pair of pneumatically tired castor wheels 17 is connected at its front to the back of the main frame 10 about a transverse axis at 18. The trailer frame carries a fairly large bin 19, capable of receiving a quantity of cane setts to be planted, and having sides and ends downwardly convergent to a bottom receptacle 20 from which the cane setts are elevated by an elevator 21, having endless chains 22 interconnected by transverse cleats 23 and driven by a hydraulic motor to convey the cane setts up the inclined front of the bin 19 and to discharge them from the head of the elevator.

The cane setts so discharged are fed gravitationally through an inlet chute 24 mounted on the rear of the main frame 10 and thence into a rotary drum 25.

The drum has a cylindrical sheet metal wall 26 and circular front and rear end plates 27 and 28 coaxial with but of somewhat greater diameter than the cylinder 26. The drum is mounted on the main frame with its axis horizontal and parallel to the direction of travel, being supported on two pairs of pneumatically tired wheels 29, each pair on a common axle 30 rotatably mounted on the main frame 10, one being driven to rotate the drum 25 about its axis by means of any suitable drive (not shown) from the wheels 14 or one of them. The rear plate 28 of the drum has a coaxial circular inlet opening 31, into the upper part of which the inlet chute 24 leads, and the front plate 27 has a similar outlet opening 32. The drum can contain, in its lower part, a quantity of treating liquid, as indicated at 33 in FIG. 2. A series of lifting members 34 of perforated sheet metal are secured to and extend radially in equally spaced relationship from the inside periphery of the cylindrical wall 26 of the drum, extending from between the front and rear plates 27 and 28, each lifting member having a perpendicular inner end flange 35 so that the member is of trough-like form.

A delivery chute 36 has its upper end within the upper part of the drum 25, above the inlet chute 24, and inclines forwardly and down through the outlet opening 32 from the drum, curves downwardly to pass between a pair of fertilizer boxes 37 on the front of the main frame 10, and leads rearwardly and down into the drill plough so as to be adapted to deliver cane setts into the furrow opened by the plough. In usual manner fertilizer is fed at the same time from the fertilizer boxes 37 into the furrow by feeder devices driven by chain and sprocket drives 38 from a pair of trailing wheels 39.

The delivery chute 36 has at its upper end a fixed guide plate 40 and a hinged guide plate 41, the ends of each closely approaching the front and rear end plates 27 and 28 of the drum 25.

In use, as the planter is drawn by the tractor with the main frame lowered onto its wheels 14, the drill plough 15 opens a furrow in the ground, and the drum 25 is rotated in the direction indicated by an arrow in FIG. 2. The elevator 21 is driven to elevate cane setts from the bin 19 and to feed them into the inlet chute 24 so that the setts, as indicated at 42 in FIG. 2, fall into the treating liquid 33 within the lower part of the drum. From this position, setts are lifted by the troughed lifting members 34 and are carried upwardly within the drum. A lifting member 34 may pick up more than one of the setts, one lying on top of the other, as indicated in FIG. 2, but as the lifting member approaches the upper part of the rotating drum, the excess sett will fall from the inclined lifting member and fall back into the lower part of the drum. The hinged guide plate 41 may be adjusted between the positions indicated in broken outline in FIG. 2 and releasably locked by any suitable means to obtain optimum results in this regard, ensuring that only one sett is fed at a time into the delivery chute. The fixed guide plate 40 is inclined to ensure that no sett discharged from a lifting member in the uppermost part of the drum will fail to be guided into the upper end of the delivery chute. The bottom of the delivery chute within the drum includes a gridded portion at 43 so that any excess treating liquid which enters the chute will drain back into the bottom of the drum.

Cane dipper-planter machines according to the invention will be found to be compact, sturdy and durable and very efficient in operation, feeding treated cane setts at a predetermined rate to the drill plough with very little likelihood of more than one sett being delivered at a time. It will, of course, be understood that the particular embodiment of the invention herein described and illustrated may be subject to many modifications of constructional detail and design, which will be readily apparent to skilled persons, without departing from the scope of the invention, hereinafter claimed.

I claim:

1. A cane dipper-planter of the type having a tractor-drawn main frame, a drill plough on the main frame for opening a furrow, a container for treating liquid, feed means for feeding cane setts to the treating liquid, and delivery means for delivering said treated cane setts, wherein the improvements comprise:

a drum having opposed spaced end walls and a peripheral side wall extending between said end walls, said drum being mounted on the main frame for rotation about a substantially horizontal axis substantially parallel to the direction of travel of said dipper-planter, the lower part of said drum forming the container for the treating liquid, means for mounting said main frame on ground wheels, means for rotating the drum, and supporting wheels for supporting said drum during rotation, an inlet opening in an end wall of the drum for feeding cane setts to said drum, and wherein said delivery means includes a delivery chute leading from within the drum through an outlet opening in the other end wall of the drum, and a series of lifting members secured to the peripheral side wall of the drum, said lifting members being of a shape and size to receive and lift cane setts, when the drum is rotated, from the lower part of the drum and discharge them gravitationally from the upper part of the drum to said delivery chute.

2. The apparatus of claim 1 wherein said delivery chute further includes a movable adjustable guide means leading from the upper part of the said delivery chute to adjustably direct thereinto setts discharged from the upper part of the drum.

3. The apparatus of claims 1 or 2 wherein said feed means includes an inlet chute mounted on the main frame and extending through said inlet opening at a point below the delivery chute.

4. The apparatus of claim 1 further including a trailer frame supported at its rear by at least one castor wheel and connected at its front pivotally about an axis transverse to the main frame, and wherein said feed means further includes a bin on said trailer frame, said bin containing a quantity of cane setts, an elevator mounted on said bin for elevating cane setts from the bin, and an inlet chute communicating with said elevator and extending through said inlet opening.

5. The apparatus of claim 1 wherein said means for rotating the drum consists of a drive from said ground wheel to a supporting wheel.

* * * * *